United States Patent Office 2,895,493
Patented July 21, 1959

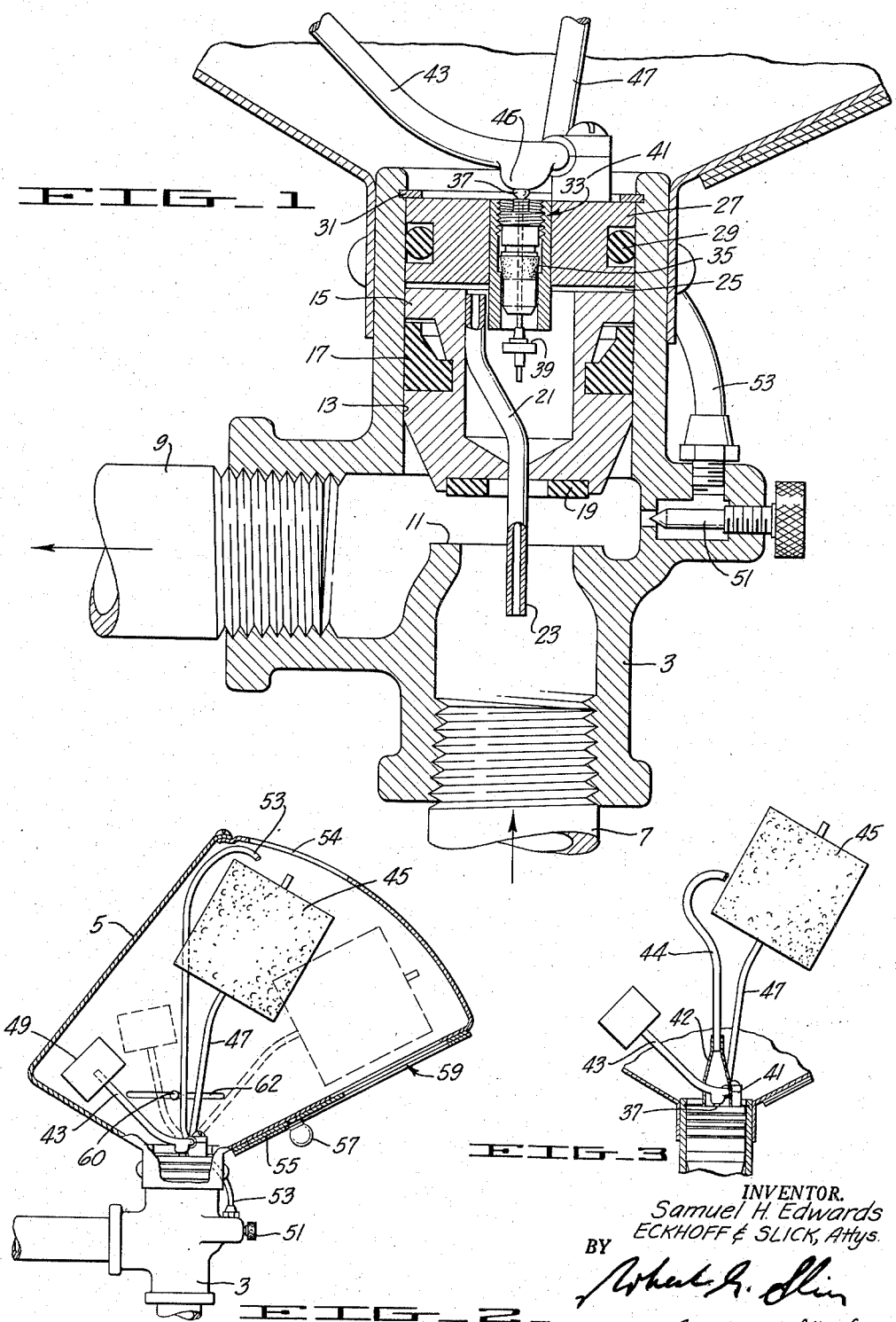
July 21, 1959 — S. H. EDWARDS — 2,895,493
VALVE STRUCTURE
Filed June 16, 1955
INVENTOR.
Samuel H. Edwards
BY ECKHOFF & SLICK, Attys.
A member of the firm

2,895,493

VALVE STRUCTURE

Samuel H. Edwards, San Pablo, Calif.

Application June 16, 1955, Serial No. 515,813

1 Claim. (Cl. 137—78)

This invention relates to an automatic watering device and, more particularly, relates to a device for automatically turning irrigation water on and off and wherein the device is capable of not only regulating the cycle of operations, depending upon the amount of water passing through the valve, but it also is capable of controlling irrigation water based on the ambient moisture conditions.

Devices have heretofore been proposed for controlling irrigation water automatically, but such devices have not been fully satisfactory since they ordinarily are complicated and bulky, and frequently do not take into account the need of the area being irrigated for moisture.

It is therefore an object of the present invention to provide an irrigation valve wherein the amount of water passing through the valve can be easily regulated and wherein the valve operates to shut itself off and on, depending on the amount of water passing through the valve.

Another object of the present invention is to provide an automatic irrigation valve which is capable of supplying irrigation water based on the need for moisture in the area being irrigated.

Still a further object of this invention is to provide an irrigating valve which is simple, inexpensive, positive in its operation, and compact.

In the drawings forming a part of the specification:

Figure 1 is a detailed view in section showing the valve proper of the present invention.

Figure 2 is a side elevation, partly in section, showing the entire structure of the present invention.

Figure 3 is a fragmentary side elevation showing an alternate structure.

Referring now to the drawings by reference characters, there is shown an irrigation valve having a body 3 and a covered hood portion 5. The valve body 3 is threaded for the reception of conventional water pipes, 7 being an inlet pipe and 9 being an outlet pipe. Within the valve body 3 a valve seat 11 is provided and located directly over the valve seat 11 is a smooth cylindrical area 13. Within the cylinder 13 a piston 15 having a gasket 17 is provided. The piston 15 has a washer 19 thereon for engagement with the valve seat 11.

Mounted within the piston 15 is a tube 21 which extends into the space 23 below the valve seat 11 and also in the space 25 above the piston. Also mounted in the cylinder 13 is an insert 27, which has a gasket 29 thereon and which is held in place by the member 31. Mounted within the insert 27 is the pilot valve which has been generally designated 33. The pilot valve has a body portion 35 and a plunger 37 therein and may be an ordinary tire valve insert. The lower part of plunger 37 has a gasket 39 thereon, which contacts the lower part of the body 35 to form a valve so that when the plunger 37 is depressed, as is shown in Figure 1, fluid can pass through the valve body and when the plunger 37 is released, an internal spring, not shown, causes the plunger 37 to go upward, closing the valve.

Mounted on the member 27 is bearing 41 on which arms 43 and 47 rotate. Arms 43 and 47 are fastened together and thus rotate as a unit. The arm 43 has a hump 46 thereon, the hump 46 normally contacting the plunger 37. Mounted on the arm 47 is a member 45. This can be an open or partially open vessel, such as a pan or bottle or a water absorptive member such as a sponge. A counter-weight 49 is attached to the end of arm 43.

At one side of the valve body 3 a needle valve 51 is provided and from needle valve 51 a tube 53 extends to a point just over the position of the sponge 45 when the sponge is in an upright position.

As is shown in the drawing, the sponge, counter-weight and termination of tube 53 are all within the housing 5. In addition, the housing 5 is provided with a shutter mechanism 55 having handle 57 thereon. The shutter mechanism is mounted to slide, leaving a variable opening generally designated 59 in the housing 5. The housing 5 is also provided with a central arm 60, which slides in slot 62 and which extends within the housing so that it can contact the arms 43 and 47 and restrict the movements of these arms in a manner hereinafter described.

The operation of the device is as follows: The pipe 7 leads to a source of water while the pipe 9 leads to a sprinkler or other irrigation device. When the arm 60 is in the central position, as is shown in Figure 2, it is apparent that the arms 43 and 47 can swing back and forth without being restricted by the arm 60. In this position, the device is fully automatic in operation and requires only that the shutter 55 be set for the desired amount of circulation of outside air and that the valve 51 be regulated to bleed off the desired amount of water. Assuming that the sponge 45 is dry and that the device has just been installed, the sponge 45 will be in an upright position, shown in solid lines in Figure 2, so that the hump 45 will press downward on the valve member 37, permitting fluid to pass through the valve. The tube 21 is exposed to the full water pressure at all times and since the valve 33 is open, water will flow upwardly through the tube 21 into the space 25 and out through the valve 33. However, since the space 25 has been opened to the atmosphere by the action of the valve 33, the pressure acting on the top of the piston 15 will be less than the pressure acting on the bottom of the piston 15 so that the piston 15 will move upwardly to the position shown in Figure 1, opening the valve formed by washer 19 and seat 11, permitting water to flow through the pipe 9. At the same time, a small amount of water will flow through tube 53 and onto the sponge 45. As water flows onto the sponge, the sponge will slowly get heavier and will eventually go to the position shown in dotted lines in Figure 2; this will release the pressure on the pilot valve stem 37. When this valve closes, pressure will build up in the area 25, and the piston will drop downwardly. This will close the valve, shutting off the flow of water both through pipe 9 and through tube 53. The valve will then stay closed until such time as the sponge member 45 dries out and rises for a repetition of the cycle. The length of time required can be adjusted by regulating the shutter member 55 and it is apparent that since the shutter member 55 may be left open, that the time will be longer in moist weather than in dry weather.

A slot 54, or similar opening is placed in the hood 5, so that rain may fall on the sponge. If desired, the opening 54 may be made very small, and a collecting basin be provided to drain into the opening; this is useful when it is desired that a long drying period be provided.

In Figure 3 an alternate form of construction is shown wherein the needle valve 51 and tube 53 are eliminated. According to this embodiment, a funnel-like hood 42 is attached to arm 43. A tube 44 leads from hood 42 to any desired point on the sponge 45. When the arm 43 goes down, the bottom of hood 42 makes a sufficiently tight seal with member 27 that water is forced up through tube 44 onto the sponge. Adjustment is provided by placing the end of tube 44 adjacent various parts of the sponge; if water flows onto the bottom part of the sponge a long time will be required for the sponge to become saturated, and vice versa.

The valve responds not only to the amount of water flowing through the valve, but also the frequency of its response is also dependent on rain, humidity, temperature and air movement and, thus, upon the need for irrigation. For instances, in rainy weather, the sponge might soak up so much moisture from the atmosphere that the valve would not open at all for extended periods.

The flow of water may also be controlled manually by the manipulation of the arm 60. If the arm 60 is extended to the extreme left in Figure 2, it is obvious that the arm 60 will bear against arm 43 and maintain the valve in an open position regardless of whether the sponge is saturated or not. On the other hand, if the arm 60 is moved to the extreme right position, the arm 60 will contact the arm 47, holding the sponge in the position shown in dotted lines in Figure 2 and keep the valve turned off.

It is believed apparent that I have provided an improved irrigation valve which is fully automatic in operation and which is capable of being readily adjustable so that water is used only when irrigation is required.

I claim:

A device for controlling the flow of water comprising: a valve body having an outlet and a vertical inlet; a partition in said valve body having a valve seat thereon directly over said inlet, said valve seat dividing the inlet and outlet; a chamber above and concentric with said inlet; a pilot valve on the upper end of said chamber to seal off the interior of said chamber to the atmosphere; resilient means operatively associated with said pilot valve to bias said pilot valve to a closed position; a piston mounted for reciprocating movement in said chamber, the lower-most surface of said piston being adapted to register with said valve seat whereby to seal off the inlet when said piston is in a lowered position; a fluid passage through the center of said piston providing communication between the inlet and said chamber whereby to provide means for equalizing the pressure on either side of said piston when said pilot valve is closed; control means extending upwardly from the top of said pilot valve for controlling the operation of said pilot valve, said means operating to open said pilot valve when said control means is depressed; a first arm pivoted at the base thereof above said chamber, said first arm having a cam thereon positioned for contact with said control means of said pilot valve, said first arm being biased to one side of the vertical so that said cam normally contacts said control means of said pilot valve; a weight on the free end of said first arm; a second arm secured at the base thereof to the base of said first arm, said second arm being biased from the vertical in a direction opposite to that of said first arm; a sponge mounted on the free end of said second arm, said sponge being of sufficient size and absorbency that when said sponge is saturated with water the moment of said second arm bearing said sponge is in excess of the moment of said first arm bearing said weight whereby said cam is caused to pivot away from said control means for said pilot valve, said moment of said second arm and sponge being less than the moment of said first arm and weight when said sponge is dry; an auxiliary fluid passage on the outlet side of said valve having adjustment means therein for controlling the flow of water therethrough, said passage terminating at the far end thereof adjacent said sponge whereby fluid passing through said passage will contact said sponge on emerging from said passage; and a hood surrounding said first arm and weight and said second arm and sponge, said hood having an open portion positioned over said sponge whereby precipitation may enter said hood and contact said sponge.

References Cited in the file of this patent

UNITED STATES PATENTS

| | | |
|---|---|---|
| 226,224 | Demarest | Apr. 6, 1880 |
| 1,675,302 | Roemer | June 26, 1928 |
| 1,822,901 | De Lacy-Mulhall | Sept. 15, 1931 |
| 2,437,764 | Spence | Mar. 16, 1948 |
| 2,577,337 | Lancaster | Dec. 4, 1951 |
| 2,608,991 | Crockett | Sept. 2, 1952 |